(12) United States Patent
Tong

(10) Patent No.: US 11,345,637 B2
(45) Date of Patent: May 31, 2022

(54) OZONATION-BASED METHOD FOR PRODUCING CEMENTITIOUS MATERIAL

(71) Applicant: Environment Sustainable System Engineering Technology Co., Ltd., Beijing (CN)

(72) Inventor: Shanghui Tong, Beijing (CN)

(73) Assignee: ENVIRONMENT SUSTAINABLE SYSTEM ENGINEERING TECHNOLOGY CO., LTD., Beijing (CN)

( * ) Notice: Subject to any disclaimer, the term of this patent is extended or adjusted under 35 U.S.C. 154(b) by 320 days.

(21) Appl. No.: 16/649,324

(22) PCT Filed: Aug. 29, 2018

(86) PCT No.: PCT/CN2018/103034
§ 371 (c)(1),
(2) Date: Mar. 20, 2020

(87) PCT Pub. No.: WO2019/062453
PCT Pub. Date: Apr. 4, 2019

(65) Prior Publication Data
US 2020/0262757 A1    Aug. 20, 2020

(30) Foreign Application Priority Data

Sep. 30, 2017  (CN) .......................... 201710939636.6

(51) Int. Cl.
| | | |
|---|---|---|
| C04B 28/30 | (2006.01) | |
| C04B 22/16 | (2006.01) | |
| B01D 53/90 | (2006.01) | |
| B01D 53/86 | (2006.01) | |
| B01D 53/14 | (2006.01) | |

(52) U.S. Cl.
CPC .......... *C04B 28/30* (2013.01); *B01D 53/1481* (2013.01); *B01D 53/1493* (2013.01); *B01D 53/8637* (2013.01); *B01D 53/90* (2013.01); *C04B 22/16* (2013.01); *B01D 2251/104* (2013.01); *B01D 2252/10* (2013.01); *B01D 2255/20723* (2013.01); *B01D 2257/302* (2013.01); *B01D 2257/404* (2013.01)

(58) Field of Classification Search
CPC ........................ B01D 53/1493; B01D 53/8637; B01D 53/60; B01D 53/1481; B01D 2258/0283; B01D 2252/10; B01D 2251/104; B01D 53/90; B01D 2251/402; B01D 2255/20723; B01D 2257/302; B01D 53/83; B01D 2257/404; Y02W 30/91; C04B 28/30; C04B 9/00; C04B 22/16; C04B 28/105; C04B 18/08; C04B 18/142; C04B 18/30; C04B 24/003; C04B 24/04

See application file for complete search history.

(56) References Cited

U.S. PATENT DOCUMENTS

| | | | | |
|---|---|---|---|---|
| 4,716,027 A | * | 12/1987 | Morrison ............... | B01D 53/34 423/208 |
| 4,915,914 A | * | 4/1990 | Morrison ............... | B01D 53/60 423/232 |
| 9,895,659 B2 | * | 2/2018 | Suchak ................... | B01D 53/40 |
| 2004/0018133 A1 | * | 1/2004 | Radway ................. | B01D 53/50 423/244.05 |
| 2008/0134888 A1 | * | 6/2008 | Chao .................... | B01J 20/3204 95/134 |

FOREIGN PATENT DOCUMENTS

| | | |
|---|---|---|
| CN | 1768902 A | 5/2006 |
| CN | 103801177 A | 5/2014 |
| CN | 104843749 A | 8/2015 |
| CN | 103585877 B | 9/2015 |
| CN | 107488021 A | 12/2017 |

OTHER PUBLICATIONS

International Search Report issued in corresponding International Application No. PCT/CN2018/103034 dated Nov. 16, 2018 (3 pages).

Written Opinion issued in corresponding International Application No. PCT/CN2018/103034 dated Nov. 16, 2018 (4 pages).

* cited by examiner

*Primary Examiner* — Timothy C Vanoy
(74) *Attorney, Agent, or Firm* — Osha Bergman Watanabe & Burton LLP

(57) ABSTRACT

An ozonation-based method for producing a cementitious material comprises the steps of: (1) mixing a flue gas with an ozone-containing gas to form a mixed flue gas; and introducing the mixed flue gas into an absorption tower, where the mixed flue gas undergoes dry desulfurization and denitrification by reacting with a powdered desulfurizing and denitrificating agent and becomes a treated flue gas; (2) subjecting the treated flue gas to dust removal to generate by-products; and (3) uniformly mixing raw materials that comprise the first by-product, magnesium oxide, fly ash and an additive to give a cementitious material, wherein on the basis of 100 parts by weight of the cementitious material, the first by-product is 20-60 parts by weight, magnesium oxide is 16-33 parts by weight, the fly ash is 15-35 parts by weight, and the additive is 1-15 parts by weight.

10 Claims, No Drawings

OZONATION-BASED METHOD FOR PRODUCING CEMENTITIOUS MATERIAL

TECHNICAL FIELD OF THE INVENTION

The present invention relates to a method for producing a cementitious material, in particular to an ozonation-based method for producing a cementitious material.

BACKGROUND OF THE INVENTION

Cementitious materials are applicable in manufacturing various building materials. There have been technologies for manufacturing cementitious materials through magnesium-based desulfurization. For example, CN104843749A discloses a method for producing raw materials of a cementitious material by using magnesium oxide desulfurizing waste liquids and residue. The method comprises: reacting sulfur dioxide and oxygen in the flue gas with a magnesium hydroxide solution by way of a highly-efficient spraying technology to generate magnesium sulfate-containing sludge; adding waste sulfuric acid and magnesium oxide to the sludge to adjust its pH to 5-6 and generate a magnesium sulfate saturated solution; subjecting the magnesium sulfate saturated solution to crystallization, thickening, solid-liquid separation and dryness to give a by-product; and mixing the by-product with a powder of light burned magnesium oxide by stirring to generate an $MgO—MgSO_4—H_2O$ ternary system cementitious material. The method cannot stabilize the content of magnesium sulfate and requires a step of increasing concentration, which further increases the input of the absorbent and the acid.

The existing apparatuses for flue gas desulfurization and denitrification mostly adopt a wet type process, so they are prone to produce a large amount of industrial waste liquid and inapplicable to arid areas. CN1768902A discloses a method for denitrificating flue gas. The method achieves the effect of denitrificating a flue gas by spraying $O_3$ as an oxidant into the flue so as to oxidize NO in the flue gas to $NO_2$ or $N_2O_5$—which is easily soluble in water, and absorbing the flue gas with water or an alkaline solution. CN103801177A discloses a method for desulfurizing and denitrificating flue gas. The method comprises: oxidizing NO in a flue gas with $O_3$ to high-valent $NO_X$; and absorbing the flue gas with magnesium oxide slurry. In the method, the magnesium oxide slurry would first absorb $SO_2$ in the flue gas by reacting with it to generate magnesium sulfite, thereby desulfurizing the flue gas. The accumulated magnesium sulfite would undergo a redox reaction with the high-valent $NO_X$ to form nitrite and sulfate. This reaction may facilitate the absorption of $NO_X$ and make highly efficient desulfurization and denitrification possible. The method is capable of denitrificating the flue gas. However, $O_3$ is easily decomposed in a high-temperature environment. It makes denitrification less efficient, resulting in an excessive amount of $O_3$. In addition, the method has to consume a large amount of water. CN103585877B discloses a system for manufacturing $MgSO_4$ by using flue gas desulfurization sludge. In the system, a $MgSO_4$ solution is produced as a by-product of desulfurization of the flue gas with $Mg(OH)_2$. To generate $MgSO_4$, the system has to use a large amount of steam in the evaporation, crystallization and dryness of the by-product. Therefore, the system costs much money to operate.

As China's economy is developing rapidly, a large amount of waste has been generated, including, for example, bottom slag from coal-fired boilers, fly ash from power plants, steel slag from steel plants, and building waste from demolition. Most of the waste has not been properly disposed or utilized, taken up many lands, and contaminated the environment.

SUMMARY OF THE INVENTION

One objective of the present invention is to provide an ozonation-based method for producing a cementitious material. The method may make full use of the by-products of flue gas desulfurization and denitrification and produce a cementitious material by combining the by-products with industrial solid waste and other materials. Another objective of the present invention is to collaboratively deal with exhaust gases and solid wastes and sustainably use resources.

The objectives of the present invention can be accomplished by the technical solutions described below.

The present invention provides an ozonation-based method for producing a cementitious material, comprising the steps of:

(1) mixing a flue gas with an ozone-containing gas to form a mixed flue gas; and introducing the mixed flue gas into an absorption tower, where the mixed flue gas undergoes dry desulfurization and denitrification by reacting with a powdered desulfurizing and denitrificating agent and becomes a treated flue gas, wherein the desulfurizing and denitrificating agent contains magnesium oxide and a catalyst, the catalyst being selected from one or more of the group consisting of oxides of vanadium, manganese, cobalt, nickel and copper;

(2) subjecting the treated flue gas to dust removal to generate by-products, wherein the by-products comprise a first by-product and a second by-product, the first by-product containing sulfate and nitrate, and the second by-product containing part of the desulfurizing and denitrificating agent that has not been reacted completely; and discharging the first by-product to a by-product container, and introducing the second by-product to the absorption tower; and (3) uniformly mixing raw materials comprising the first by-product, magnesium oxide, fly ash and an additive to give a cementitious material, wherein on the basis of 100 parts by weight of the cementitious material, the first by-product is 20-60 parts by weight, magnesium oxide is 16-33 parts by weight, the fly ash is 15-35 parts by weight, and the additive is 1-15 parts by weight.

In the method of the present invention, it is preferable that in step (3), on the basis of 100 parts by weight of the cementitious material, the raw materials further comprising 9-25 parts by weight of slag.

In the method of the present invention, it is preferable that in step (3), on the basis of 100 parts by weight of the gelling material, the first by-product is 20-25 parts by weight, magnesium oxide is 16-20 parts by weight, the fly ash is 25-30 parts by weight, the slag is 15-20 parts by weight, and the additive is 6-10 parts by weight.

In the method of the present invention, it is preferable that in step (1), the catalyst is an oxide of vanadium, and the catalyst accounts for 0.01-0.05 wt % of the desulfurizing and denitrificating agent.

In the method of the present invention, it is preferable that in step (1), the mixed flue gas in the absorption tower has a moisture content of 3.5-6 wt %.

In the method of the present invention, it is preferable that in step (1), the flue gas has a dust content of 20-70 $mg/Nm^3$.

In the method of the present invention, it is preferable that in step (1), the flue gas has a temperature of 90-200° C., and the ozone-containing gas has an ozone content of 2-15 wt %.

In the method of the present invention, it is preferable that in step (1), the ozone-containing gas is injected into the flue gas through a high-pressure atomizing nozzle and mixed with the flue gas; the high-pressure atomizing nozzle has pressure of 0.7-1.0 MPa, and the direction of the outlet of the high-pressure atomizing nozzle and the direction in which the flue gas flows forms an angle of 80-120 degrees.

In the method of the present invention, it is preferable that in step (2), the first by-product and the second by-product are at a weight ratio of 1-2:1-2.

In the method of the present invention, it is preferable that in step (3), the additive is selected from one or more of dihydrogen phosphate, monohydrogen phosphate, tartaric acid, tartrate, and amino trimethylene phosphonic acid.

The present invention is capable of removing sulfur dioxide and nitrogen oxides from flue gases by using magnesium oxide as an absorbent in combination with ozone oxidation. The resultant by-product is directly used as a raw material for the production of a cementitious material. The present invention uses the by-product of ozonation-based dry desulfurization and denitrification as a raw material to produce a cementitious material, thereby making it possible to collaboratively deal with exhaust gases and solid wastes and sustainably use resources. In comparison with the conventional dry desulfurization and denitrification, the ozonation-based dry desulfurization and denitrification of the present invention remarkably reduces the consumption of water and steam and saves resources and energy.

DETAILED DESCRIPTION OF EMBODIMENTS

The following is a further description of the present disclosure by way of embodiments, but the scope of protection of the present invention is not limited to them.

The cementitious material produced by the method of the present invention is usable in producing various building materials. The ozonation-based method for producing a cementitious material according to the present invention comprises steps of (1) flue gas desulfurization and denitrification; (2) dust removal; and (3) cementitious material production. See below for the detailed description of the method.

<Flue Gas Desulfurization and Denitrification>

The step of flue gas desulfurization and denitrification is to mix a flue gas with an ozone-containing gas to form a mixed flue gas, and introduce the mixed flue gas into an absorption tower, where the mixed flue gas undergoes dry desulfurization and denitrification by reacting with a powdered desulfurizing and denitrificating agent, thereby generating a by-product and becoming a purified flue gas. The dry desulfurization and denitrification may be performed in apparatus common in the art, so no more details are presented here.

In the present invention, the flue gas may be subjected to a preliminary dust removal treatment beforehand. The preliminary dust removal treatment may be performed in an electrostatic dust removal apparatus. Preferably, the flue gas that has been subjected to the preliminary dust removal has a dust content of 20-70 mg/Nm$^3$, preferably 30-50 mg/Nm$^3$. A dust content in such a range can effectively improve the efficiency of the desulfurization and denitrification. After the flue gas that has been subjected to the preliminary dust removal is mixed with an ozone-containing gas, nitric oxide in the flue gas reacts with ozone to generate high-valent nitrogen oxides. In the present invention, if the flue gas temperature is too high before its reaction with the ozone-containing gas, urgent cooling treatment for overheating may be performed. For example, water spraying may be performed to reduce the temperature of the flue gas to 90-200° C., more preferably 90-120° C.

In the present invention, the flue gas may come from a sintering machine, a pellet, or a kiln. Preferably, the flue gas has a sulfur dioxide content of 3,000 mg/Nm$^3$ or less, a nitrogen oxide content of 500 mg/Nm$^3$ or less, and an oxygen content of 10-20 vt %. Using these parameters may help to obtain by-products in stable quality, and thus help to stably produce a fiber cement product.

In the present invention, the ozone-containing gas is prepared by an ozone generator. The ozone-containing gas has an ozone content of 2-15 wt %, preferably 5-2 wt %, and more preferably 7-10 wt %. Such an ozone content not only ensures an acceptable oxidation effect but also saves ozone. The flue gas and the ozone-containing gas may react with each other in an ozone pipe. The ozone pipe may be made of glass fiber reinforced plastics covered with carbon fiber, for example, SS316L. The ozone-containing gas may enter the ozone pipe through a high-pressure atomizing nozzle and be mixed with the flue gas therein. The high-pressure atomizing nozzle has a pressure of 0.7-1.0 MPa, preferably 0.8-0.9 MPa. It is preferable that the direction of the outlet of the high-pressure atomizing nozzle and the direction in which the flue gas flows form an angle of 80-120 degrees, and more preferably 90-100 degrees.

In the present invention, the desulfurizing and denitrificating agent may comprise magnesium oxide and a catalyst. Magnesium oxide may have a particle diameter of 200-800 mesh, preferably 250-600 mesh. The catalyst is capable of oxidizing sulfur dioxide to sulfur trioxide; it is at least one selected from the group consisting of oxides of vanadium, manganese, cobalt, nickel, and copper, preferably an oxide of vanadium, and more preferably $V_2O_5$. In the present invention, the catalyst preferably accounts for 0.01-0.05 wt % of the desulfurizing and denitrificating agent, more preferably 0.02-0.04 wt %.

In the present invention, before entering the absorption tower, the desulfurizing and denitrificating agent is first humidified so that it can be conveniently fed into the absorption tower by being sprayed. In addition, the humidification makes the moisture content of the flue gas in the absorption tower reach 3.5-6 wt %. Because of such a moisture content, $O_3$ undergoes a chain reaction in the presence of a large number of hydroxide ions in the tower and thereby generates hydroxyl radicals. As a result, much less $O_3$ is needed.

In the absorption tower, the powdered desulfurizing and denitrificating agent is sprayed out through a plurality of spray absorption layers. After the mixed gas enters the tower, it flows from the bottom to the top. NO is oxidized by $O_3$ to high-valent nitrogen oxides. In the action of the catalyst in the desulfurizing and denitrificating agent, $SO_2$ is oxidized to $SO_3$. The high-valent nitrogen oxides and $SO_3$ react with magnesium oxide in the desulfurizing and denitrificating agent and generate magnesium sulfate and magnesium nitrate, thereby desulfurizing and denitrificating the flue gas. The treated flue gas is discharged from the absorption tower. The generated magnesium sulfate has a grain size of larger than 0.15 mm, preferably larger than 0.2 mm.

<Dust Removal>

In the present invention, after being discharged from the absorption tower, the treated flue gas enters a dust removal apparatus for dust removal, thereby gives a purified flue gas and generates by-products. The purified flue gas is discharged to the atmosphere, and at least part of the by-products obtained from the dust removal is discharged. The by-products obtained from the dust removal comprise a first by-product and a second by-product. In the present invention, the first by-product contains sulfates (e.g., magnesium sulfate), nitrates (e.g., magnesium nitrate), and the like that come from desulfurization and denitrification of the flue gas, and can be discharged directly. The second by-product contains a part of the desulfurizing and denitrificating agent that has not reacted with the flue gas, therefore it is returned to the absorption tower for reuse. The purified flue gas is discharged into the atmosphere through a chimney. An induced draft fan may be provided between the dust removal apparatus and the chimney to facilitate the discharge of the purified flue gas.

In the present invention, a part of the by-products is discharged, and the other part is returned to the absorption tower. For example, the by-products are first discharged into an ash bin from which two pipes diverge. One of the two pipes discharges the first by-product to a bin, and the other returns the second by-product to the absorption tower. Preferably, a circulating pump is provided on the pipe between the ash bin and the absorption tower so that the other part of the by-products can be smoothly returned to the absorption tower. In the present invention, the first by-product and the second by-product are at a weight ratio of 1-2:1-2, preferably 1:1.

<Cementitious Material Preparation>

The cementitious material is generated by uniformly mixing the raw materials comprising the first by-product, magnesium oxide, fly ash and an additive. The raw materials may further comprise slag. On the basis of 100 parts by weight of the cementitious material, the first by-product is 20-60 parts by weight, magnesium oxide is 16-33 parts by weight, the fly ash is 15-35 parts by weight, and the additive is 1-15 parts by weight. The raw materials may also comprise 9-25 parts by weight of slag. In one embodiment of the present invention, on the basis of 100 parts by weight of the cementitious material, the first by-product is 20-25 parts by weight, magnesium oxide is 16-20 parts by weight, the fly ash is 25-30 parts by weight, the slag is 15-20 parts by weight, and the additive is 6-10 parts by weight.

In the present invention, magnesium oxide has a particle diameter of 200-800 mesh, preferably 250-600 mesh. The fly ash may be discharged from a dust removal apparatus of a power plant, a steel plant, a coal-fired boiler, a sintering machine, a shaft furnace, a pellet, or the like. The fly ash preferably has a particle diameter of larger than 200 mesh, more preferably larger than 250 mesh. The slag may be furnace slag, mine slag, steel slag or iron slag and brought about by a power plant, a steel plant or a chemical plant. The slag may be ground into slag powder before its use. For example, it may be ground to have a particle diameter of larger than 200 mesh, preferably larger than 250 mesh. The additive may be one or more selected from the group consisting of dihydrogen phosphate, monohydrogen phosphate, tartaric acid, tartrate, and amino trimethylene phosphonic acid, and it is preferably dihydrogen phosphate.

The raw materials may be uniformly mixed using a conventional method. The mixing apparatus may be a single-shaft mixer, a double-shaft mixer, or an agitator, and it is preferably an agitator.

The term "part" in the following preparatory example and examples means a part by weight unless otherwise specified.

The properties of the cementitious materials in the following examples were measured by following GB/T50448-2008. Of the properties, density and water absorption were results of testing the cementitious materials after they had been cured for 28 days.

Preparatory Example 1

A flue gas having a dust content of 30 mg/Nm$^3$ was obtained by subjecting a flue gas from a steel plant furnace to a preliminary dust removal treatment. The flue gas subjected to the preliminary dust removal treatment was cooled to 110° C. through urgent cooling treatment for overheating. Then, the flue gas entered the ozone pipe, where it was mixed with an ozone-containing gas and became a mixed flue gas. The ozone-containing gas was prepared by an ozone generator and had an ozone content of 10 wt %. The ozone-containing gas was sprayed into the ozone pipe through a high-pressure atomizing nozzle and mixed with the flue gas. The direction of the outlet of the high-pressure atomizing nozzle and the direction in which the flue gas flew formed an angle of 90 degrees. The high-pressure atomizing nozzle had a pressure of 0.9 MPa. Once humidified, the dry powder of a desulfurizing and denitrificating agent containing magnesium oxide and vanadium pentoxide entered the flue gas absorption apparatus, and was sprayed out through a plurality of spray absorption layers, thereby absorbing sulfur dioxide and nitrogen oxides in the flue gas. Vanadium pentoxide accounted for 0.03 wt % of the desulfurizing and denitrificating agent. In the flue gas absorption apparatus, the flue gas had a moisture content of 3.5 wt %.

After being processed in the flue gas absorption apparatus, the treated flue gas was discharged into a dust removal apparatus for dust removal, where it became a purified flue gas and generated by-products. The purified flue gas was discharged into the atmosphere through the chimney in the action of an induced draft fan. The by-products entered an ash bin, from which magnesium sulfate and magnesium nitrate and the like produced by desulfurization and denitrification of the flue gas were discharged as a first by-product into a by-product bin, and part of the desulfurizing and denitrificating agent that was not reacted completely was returned as a second by-product by a circulating pump to the flue gas absorption apparatus for recycling use. The parameters of the desulfurization and denitrification are shown in Tables 1-3.

TABLE 1

Parameters of Flue Gas before Desulfurization and Denitrification

| No. | Parameter | Value | Unit |
|---|---|---|---|
| 1 | Flow velocity of flue gas at inlet (in working condition) | 12000012 | m$^3$/h |
| 2 | Flow velocity of flue gas in standard condition | 793227 | Nm$^3$/h |
| 3 | Temperature of flue gas at inlet | 140 | ° C. |
| 4 | Sulfur dioxide content at inlet | 2000 | mg/Nm$^3$ |
| 5 | Nitrogen oxide content at inlet | 400 | mg/Nm$^3$ |
| 6 | Dust content at inlet | 98 | mg/Nm$^3$ |
| 7 | Moisture content of flue gas | 5.7 | % by mass |

TABLE 2

Parameters of Flue Gas after Desulfurization and Denitrification

| No. | Item | Value | Unit |
|---|---|---|---|
| 1 | Flow velocity of flue gas at outlet (in working condition) | 917737 | m$^3$/h |

TABLE 2-continued

Parameters of Flue Gas after Desulfurization and Denitrification

| No. | Item | Value | Unit |
|---|---|---|---|
| 2 | Temperature of discharged flue gas | 65 | ° C. |
| 3 | Sulfur dioxide content of discharged flue gas | 16 | mg/Nm$^3$ |
| 4 | Desulfurization rate | 99.07 | % |
| 5 | Nitrogen oxides content of discharged flue gas | 60 | mg/Nm$^3$ |
| 6 | Denitrification rate | 82.65 | % |
| 7 | Dust content at outlet | 3 | mg/Nm$^3$ |
| 8 | Dust removal rate | 96.46 | % |
| 9 | Output of the first by-product | 4.1 | t/h |

TABLE 3

Technical Indexes of Desulfurization and Denitrification

| Time (min) | SO$_2$ content at inlet (mg/Nm$^3$) | SO$_2$ content at outlet (mg/Nm$^3$) | NO$_x$ content at inlet (mg/Nm$^3$) | NO$_x$ content at outlet (mg/Nm$^3$) | Consumption of O$_3$ (kg) |
|---|---|---|---|---|---|
| 10 | 2038 | 16 | 420 | 55 | 21.2 |
| 20 | 2019 | 15 | 406 | 58 | 23.6 |
| 30 | 2007 | 14 | 402 | 51 | 22.1 |
| 40 | 2021 | 15 | 386 | 42 | 19.4 |
| 50 | 2019 | 16 | 375 | 50 | 18.9 |
| 60 | 1963 | 13 | 419 | 60 | 22.5 |
| 70 | 1992 | 14 | 397 | 53 | 19.8 |

The present invention achieved a desulfurization rate of 99.08%, which was higher than the design value, and led to a sulfur dioxide content at the outlet which was far lower than the national standard. Compared with the traditional O$_3$-based denitrification technologies, the present invention reduced O$_3$ consumption by 25-33% and achieved an average denitrification rate of 84% or more.

Examples 1-2

The first by-product from Preparatory example 1, magnesium oxide, fly ash, slag (a slag powder), and an additive (sodium dihydrogen phosphate) were mixed uniformly to give a cementitious material. The cementitious material was cast in a mold with a size of 40 mm×40 mm×160 mm, and cured at 60% R.H. and 40° C. for 3 days, 7 days, and 28 days. The specific formulations and product properties are shown in Tables 4-5.

TABLE 4

Formulation of Cementitious Materials (Parts by Weight)

| No. | First by-product | Magnesium oxide | Slag | Fly ash | Additive |
|---|---|---|---|---|---|
| Example 1 | 20 | 20 | 20 | 30 | 10 |
| Example 2 | 22 | 18 | 20 | 30 | 10 |

TABLE 5

Product Properties

| No. | Number of days for curing | Compressive strength (MPa) | Water absorption (%) | Bending strength (MPa) |
|---|---|---|---|---|
| Example 1 | 3 | 30 | 6.8 | 9 |
|  | 7 | 62 | 5.9 | 12 |
|  | 28 | 112 | 3.6 | 20 |
| Example 2 | 3 | 28 | 8.6 | 8 |
|  | 7 | 57 | 7.9 | 13 |
|  | 28 | 98 | 5.6 | 18 |

The present invention is not limited to the embodiments described above. Any variation, improvement, or substitution which those skilled in the art can think of but which does not depart from the essence of the present invention falls into the scope of the present invention.

What is claimed is:

1. An ozonation-based method for producing a cementitious material, comprising the steps of:
    (1) mixing a flue gas with an ozone-containing gas to form a mixed flue gas; and introducing the mixed flue gas into an absorption tower, where the mixed flue gas undergoes dry desulfurization and denitrification by reacting with a powdered desulfurizing and denitrificating agent and becomes a treated flue gas, wherein the desulfurizing and denitrificating agent contains magnesium oxide and a catalyst, the catalyst being selected from one or more of the group consisting of oxides of vanadium, manganese, cobalt, nickel and copper;
    (2) subjecting the treated flue gas to dust removal to generate by-products, wherein the by-products comprise a first by-product and a second by-product, the first by-product containing sulfate and nitrate, and the second by-product containing a part of the desulfurizing and denitrificating agent that has not been reacted completely; and discharging the first by-product to a by-product container, and introducing the second by-product to the absorption tower; and
    (3) uniformly mixing raw materials comprising the first by-product, magnesium oxide, fly ash and an additive to give a cementitious material, wherein on the basis of 100 parts by weight of the cementitious material, the first by-product is 20-60 parts by weight, magnesium oxide is 16-33 parts by weight, the fly ash is 15-35 parts by weight, and the additive is 1-15 parts by weight.

2. The method according to claim 1, wherein the raw materials further comprising 9-25 parts by weight of slag on the basis of 100 parts by weight of the cementitious material.

3. The method according to claim 2, wherein the first by-product is 20-25 parts by weight, magnesium oxide is 16-20 parts by weight, the fly ash is 25-30 parts by weight, the slag is 15-20 parts by weight, and the additive is 6-10 parts by weight.

4. The method according to claim 3, wherein the catalyst is an oxide of vanadium, and the catalyst accounts for 0.01-0.05 wt % of the desulfurizing and denitrificating agent.

5. The method according to claim 1, wherein the mixed flue gas in the absorption tower has a moisture content of 3.5-6 wt %.

6. The method according to claim 1, wherein the flue gas in step (1) has a dust content of 20-70 mg/nm$^3$.

7. The method according to claim 1, wherein the flue gas in step (1) has a temperature of 90-200° C., and the ozone-containing gas has an ozone content of 2-15 wt %.

8. The method according to claim 1, wherein the ozone-containing gas is injected into the flue gas through a high-pressure atomizing nozzle and mixed with the flue gas; the high-pressure atomizing nozzle has pressure of 0.7-1.0 MPa, and the direction of the outlet of the high-pressure atomizing nozzle and the direction in which the flue gas flows forms an angle of 80-120 degrees.

9. The method according to claim 1, wherein the first by-product and the second by-product are at a weight ratio of 1-2:1-2.

10. The method according to claim 1, wherein the additive is selected from one or more of dihydrogen phosphate, monohydrogen phosphate, tartaric acid, tartrate, and amino trimethylene phosphonic acid.

\* \* \* \* \*